United States Patent [19]

Hrovat et al.

[11] Patent Number: 5,751,579
[45] Date of Patent: May 12, 1998

[54] VEHICLE CONTROL SYSTEM EMPLOYING IMPROVED METHODS AND APPARATUS FOR ESTIMATING APPLIED WHEEL TORQUE

[75] Inventors: Davorin David Hrovat, Dearbrn; Daniel Scott Colvin, Farmington; Michael Alan Weyburne, Northville; Ngoc Minh Tran, Dearborn; John Loring Yester, Bloomfield, all of Mich.

[73] Assignee: Ford Global Technologies, Inc., Dearborn, Mich.

[21] Appl. No.: 524,274

[22] Filed: Sep. 6, 1995

[51] Int. Cl.$^6$ .................................................. B60K 41/00
[52] U.S. Cl. ........................................................ 364/426.015
[58] Field of Search ............... 364/426.015, 424.058, 364/424.083, 426.027, 426.029, 426.033, 426.037

[56] References Cited

U.S. PATENT DOCUMENTS

| | | | |
|---|---|---|---|
| 4,108,136 | 8/1978 | Hideg et al. | 123/209 |
| 4,259,932 | 4/1981 | Hideg et al. | 123/209 |
| 4,346,625 | 8/1982 | Latsch et al. | 74/859 |
| 4,501,138 | 2/1985 | McCandless | 73/116 |
| 4,580,465 | 4/1986 | Omitsu | 74/866 |
| 4,841,447 | 6/1989 | Hayashi et al. | 364/431.07 |
| 5,047,937 | 9/1991 | Vahabzadeh et al. | 364/424.1 |
| 5,184,577 | 2/1993 | Kato et al. | 123/90.15 |
| 5,483,446 | 1/1996 | Momose et al. | 364/424.01 |
| 5,490,064 | 2/1996 | Minowa et al. | 364/424.01 |
| 5,628,378 | 5/1997 | Saito et al. | 180/197 |

OTHER PUBLICATIONS

Hori et al., "High Performance Automotive Engine Control in Engine Tester," Industry Applications 1995 Conf., 1995, pp. 1572–1579.

*Primary Examiner*—Kevin J. Teska
*Assistant Examiner*—Stephen J. Walder, Jr.
*Attorney, Agent, or Firm*—Joseph W. Malleck, Esq.

[57] ABSTRACT

A vehicle traction control system is controlled in-part by a signal value indicative of estimated wheel torque. The estimated wheel torque value is produced within the vehicle's electronic engine control (EEC) module by summing a first value which indicated the estimated torque attributable to engine combustion and a second value which is proportional to engine acceleration/deceleration which indicates the amount of torque attributable to the inertial movement of engine and drive train masses. Before summing the two signal components, the signal which indicates combustion torque is delayed with respect to the signal indicating inertial torque by a delay interval whose duration varies with engine speed to take into account the delay between intake fuel rate changes and combustion forces as well as delays attributable to the timing of the calculations themselves.

10 Claims, 1 Drawing Sheet

VEHICLE CONTROL SYSTEM EMPLOYING IMPROVED METHODS AND APPARATUS FOR ESTIMATING APPLIED WHEEL TORQUE

FIELD OF THE INVENTION

This invention relates to electronic vehicle control systems and more particularly, although in its broader aspects not exclusively, to traction control systems and the like.

BACKGROUND OF THE INVENTION

Vehicle traction control and traction assist systems commonly employ two control modules: (1) a anti-skid brake system (ABS) module which controls the application of torque to the wheels from both the engine and the braking system, and (2) an electronic engine control (EEC) module which responds to commands from a variety of sources, including the ABS module, to control the amount of power produced by the engine. To achieve traction control, the ABS module receives a value from the EEC module indicating the estimated wheel torque, which the ABS module then uses to form and evaluate control commands sent to the EEC module and the braking system.

In prior systems, the EEC module produces the estimated wheel torque value by first calculating actual engine torque based on the current engine operating conditions, and then employs the resulting engine torque value in combination with vehicle status information (the current gear ratio and losses caused by other power consumers such as the air conditioner, etc.)

Comparisons of the actual measured wheel torque with the estimated wheel torque values produced by conventional methods has shown that these predicted torque values are prone to significant error because the mechanism for generating the estimated value does not take inertial forces and other effects into account.

SUMMARY OF THE INVENTION

The present invention takes the form of vehicle control system, such as a traction control system, which incorporates an improved method for estimating the amount of torque applied to a vehicle's wheels by the engine and power train.

In accordance with a first feature of the invention, means are employed for generating a first value which indicates the amount of torque generated by combustion within the engine and for generating a second value which indicates the amount of torque attributable to the inertia of the moving engine and power train components. Means are then employed for forming an estimated wheel torque value by summing the first and second values, thereby accounting for inertial forces when the engine and power train is accelerating or decelerating.

In accordance with a second feature of the invention, means are employed for delaying the first value representative of torque attributable to combustion with respect to the second value representative of inertial torque by a variable time delay interval prior to combining those first and second values.

As contemplated by the foregoing second feature of the invention, the variable time delay interval has a duration which takes into account the engine's inherent combustion delay; that is, the delay between the changes in the intake air and fuel rates and consequent changes in engine torque attributable to those intake changes, and further takes into account delays attributable to the signal processing required to generate the torque estimates. The interval by which the combustion torque value is delayed with respect to the inertial torque value is accordingly determined in response to current engine speed, with increasing engine rpm resulting in a corresponding decrease in the delay interval.

The methods and apparatus contemplated by the present invention are preferably implemented using a conventional electronic engine control module which employs a micro controller to process input signal values to produce the desired applied wheel torque values. These torque estimates are calculated at repeated intervals within a timed "background" process repeatedly initiated at a predetermined timed intervals. In accordance with this aspect of the invention, the desired delay interval is advantageously formed by an integral number of background loop intervals. Accordingly, to introduce a delay corresponding to the combustion delay while also taking signal processing delays into account, a first (engine torque) value produced during a selected prior background loop process is combined with the second (inertial torque) value produced during the current background loop process.

The more accurate applied wheel torque values produced in accordance with the present invention improve the performance of the traction control systems and the like by sharing instrumentalities, including the micro controller, sensors, and related devices which are used in the conventional EEC module, thus providing improved performance without adding significant additional costs or significantly increasing the computational burden placed on the EEC micro controller.

These and other features and advantages of the present invention may be better understood by considering the following detailed description of a preferred embodiment of the invention.

During the course of this description, frequent reference will be made to the attached drawing.

DESCRIPTION OF THE PREFERRED EMBODIMENT

Figure 1:
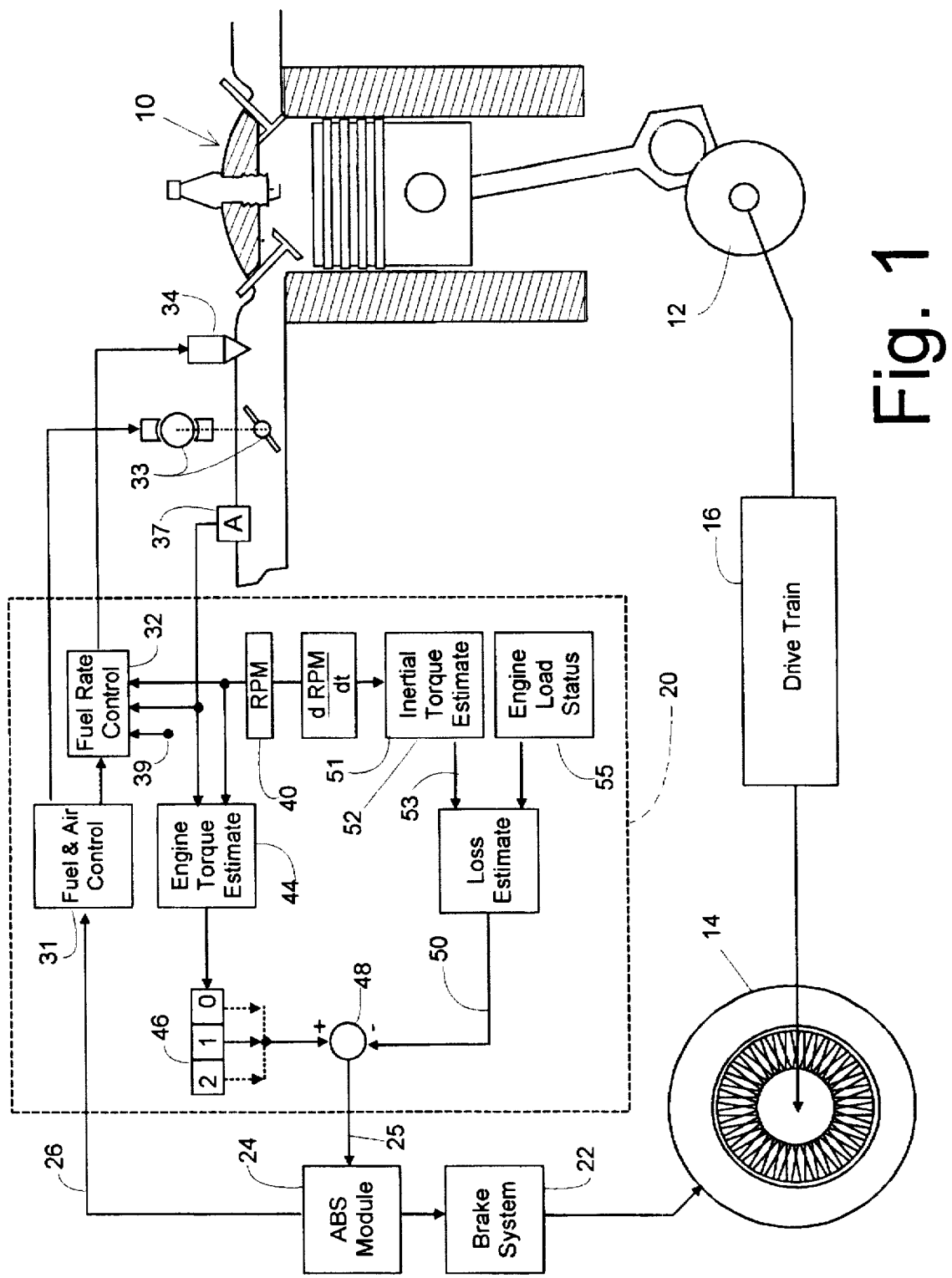
FIG. 1 is a schematic block diagram of a preferred vehicle traction control system which embodies the invention.

The illustrative control system utilizing the invention depicted in FIG. 1 is used with an internal combustion engine indicated generally at 10. The engine's crankshaft 12 applies torque to a driven wheel 14 through a conventional drive train illustrated at 16. The amount of torque applied to the drive wheel 14 by the engine 10 through the drive train 16 is controlled by an electronic engine control (EEC) module 20 which utilizes the invention as described below.

In addition to the torque applied to the wheel 14 by the drive train 16, braking torques are applied by a brake system 22 which is controlled by a conventional anti-skid brake system (ABS) module 24. In addition to controlling the brake system 22, the ABS module also sends commands to the EEC module 20 via a communication pathway 26 to indicate the amount by which applied wheel torques should be reduced such that the application of excessive engine torque via the drive train 16 does not cause a loss of traction. In order to determine the magnitude of the desired torque reduction, the ABS module 24 utilizes a value supplied from the EEC module 20, as indicated at 25. The value 25 is generated by the EEC module 20 in the manner to be described to provide an indication of the estimated magnitude of the torque applied to wheel 14 via the drive train 16.

Conventional EEC modules have heretofore produced the required estimated wheel torque value based on the magnitude of air and fuel being delivered to the engine, taking into account various vehicle status indications, including the current transmission gear ratio and the extent to which other systems, such as the vehicle's air conditioner, alternator, etc. impose a load on the engine which is reflected as a loss of wheel torque.

Although these prior techniques have produced workable estimates of wheel torque, they are subject to inaccuracy, particularly during periods of significant acceleration and deceleration. Inertial torques produced by the moving engine and drive train masses are not taken into account in conventional systems. During acceleration, the resulting overestimation of applied engine torque can lead to excessively aggressive reductions in engine power, or to the application of excessive braking torques, resulting in poorer driveability. When inertial effects are ignored during deceleration, the estimate of applied wheel torque is too low, the need for reduced engine power is underestimated, and the effectiveness of the traction control system during engine braking is adversely affected.

In order to form an accurate estimate of applied wheel torque, it is also important to take into account the relative timing of the effects being taken into account, as well as the signal processing delays which occur as the estimates are generated.

An indicated change in the rate at which air and fuel are supplied to the intake of an engine is not immediately manifested as a corresponding change in the speed of the engine and the drive train masses coupled to the crankshaft. A "combustion delay" typically on the order of 270° to 360° of crankshaft rotation must occur before changes at the intake result in changes in combustion that effect the engine's speed. Depending on the fuel injection scheme employed, this delay could be as much as 720°, in the case of bank-to-bank fuel injection for example. As a result, estimated engine torque values which are determined from intake flow rates should be delayed by an interval representing the combustion delay before being combined with the inertial torque.

Moreover, when the estimate is produced by the EEC module, the signal processing occurs at timed intervals during "background loop" periods. As a consequence, there is a computational delay between engine torque estimates which should be taken into account when the estimated wheel torque is determined in order to achieve the greatest accuracy.

The preferred embodiment of the invention shown illustrated in FIG. 1 is preferably implemented by using the processing capabilities of the micro controller and the associated vehicle and engine status sensors which are already used for conventional fuel control processing within a conventional EEC module. As depicted in FIG. 1, the EEC control system 20 utilizes a conventional air and fuel control mechanism 31, and possibly a spark timing control mechanism (not shown), to respond to the torque reduction commands from the ABS module 24 via a signal pathway 26. The fuel and air control mechanism 31 operates a "drive by wire" throttle valve indicated at 33 to control intake air flow, and further provides control signals to a fuel rate control unit 32.

The fuel rate control unit 3 controls the fuel delivery rate supplied by fuel injector(s) indicated at 34 in response to several inputs including: a measured intake air flow from an air flow indicator illustrated at 37; a supplied measurement of the oxygen level in the engine exhaust as indicated at 39; and from the current engine speed provided by an RPM indicator 40. The fuel rate control unit 32 maintains the air/fuel mixture at or near stoichiometry to minimize undesired combustion.

The EEC module 20 further includes a conventional mechanism 44 for generating an output value indicative of the estimated engine torque based on the quantity of combustibles being supplied at the engine intake. The EEC module processing that produces the output value which indicates "combustion torque" may usefully take into account a number of effects, including torque converter characteristics specified by torque conversion curve values which are produced as a function of engine speed. The combustion torque values calculated at 44 may also advantageously take into account higher frequency (3–10 hertz) torque variations resulting from drive train "shuffle" dynamics.

As contemplated by the present invention, the resulting engine combustion torque estimate thus derived is then delayed by a time delay mechanism 46 for a variable delay interval and is then combined with a value supplied via line 50 representing the combined torques attributable to engine losses and the inertia of the engine/impeller system and related systems.

The component of wheel torque which is attributable to inertial effects is determined by first determining the rate-of-change in engine RPM at 51 and then multiplying the resulting acceleration/deceleration value times a constant which represents the inertial mass of the engine and relevant drive train masses. This predetermined constant is calculated or measured to reflect the mass of the moving impeller masses and, for the purposes of determining its effect on torque, is expressed as a moment of inertia value typically equal to about 0.2 kg-m². The multiplication of engine/drive train acceleration times the moment of inertia value is seen at 52 in FIG. 1 and produces a value at 53 indicating the estimated inertial torque.

The estimated inertial torque value at 53 is combined at 54 with torque losses from other sources as indicated by operating status inputs from the source 55 which indicate factors as the additional load on the engine imposed when the air conditioner is operating and when the alternator is drawing power. These values are combined at 54 to form a current torque adjustment value at 60. The current torque adjustment value on line 50 which is then combined additively with the (possibly delayed) estimated engine torque value supplied from the delay unit 46. The combined signal at 25 is supplied to the ABS module 24 and/or to other vehicle control system functions that utilize the value of estimated wheel torque.

The delay unit 46 as shown in FIG. 1 delays the value of estimated engine torque determined at 44 by an integral number of "background loop times" depending on the engine's actual rpm. Conventional EEC control systems perform the processing (seen at 44) necessary to generate the estimated engine torque in a "background loop" which is initiated at predetermined clocked intervals established by the micro controller's interrupt rate. These calculations are thus performed to generate a new engine torque estimate approximately once every 50 ms (20 times per second). As a consequence, since the engine torque estimates are only formed at intervals, the delay to be imposed on the engine torque estimate before it is adjusted to reflect the inertial effects and engine loading, should also be in integral "background loop time" units. Based on measured comparisons of actual wheel torque with the torque estimated using the present invention, it has been determined that a significant improvement in accuracy can be obtained, given a background loop time of approximately 50 ms., by delaying the engine torque estimate with respect to the inertial torque estimate by two background loop time delays (100 ms.) when the engine speed is less than 1,000 rpm, by one loop interval whine engine speed is between 1,000 and 2,500 rpm, and by introducing no delay at all when the engine speed exceeds 2,500 rpm.

It is to be understood that the embodiment of the invention described above is merely illustrative on one application of the principles of the invention. Numerous modifications may be made to the methods and apparatus described without departing from the true spirit and scope of the invention.

What is claimed is:

1. A traction control system for a vehicle comprising:

an internal combustion engine equipped with a fuel rate controller responsive to a first control signal for applying a variable amount of drive torque to at least one drive wheel through a drive train, a brake system for applying braking torques to said drive wheels in response to a second control signal, an anti-skid control module connected to supply said first signal to said fuel rate controller and further connected to supply said second control signal to said brake system, said antiskid control module being responsive to a third control signal having a value indicating the estimated magnitude of said drive torque, means coupled to said fuel rate controller for generating a first value indicative of the amount of wheel torque generated by said internal combustion engine, means coupled to said engine for generating a second value proportional to the rate of change of the operating speed of said engine and indicative of the amount of wheel torque produced by the inertial movement of said engine and said drive train, and means for summing said first and second values to form said third control signal.

2. A traction control system as set forth in claim 1 wherein said means for summing said first and second values includes means for delaying said second value relative to said first value by a variable time interval prior to summing said first and second values to form said third controls signal.

3. A traction control system as set forth in claim 2 including means for decreasing the duration of said variable time interval in response to increases in the operating speed of said engine.

4. Apparatus as set forth in claim 2 wherein said means for producing said second signal value comprises processing means for generating said second signal value at times separated by a predetermined duration, and wherein the duration of said relative time delay interval is an integral multiple of said predetermined duration selected in response to the current speed of the engine.

5. In electronic engine control module for controlling the operation of an internal combustion engine in a vehicle, a mechanism for producing an output signal value indicative of the estimated magnitude of torque applied to a drive wheel of said vehicle by said engine, said mechanism comprising, means jointly responsive to the speed of said engine and the rate at which fuel is supplied to said engine for generating a first signal value indicative of the magnitude of torque applied to said drive wheel due to combustion within said engine, means responsive to the rate of change of the speed of said engine for generating a second signal value indicative of the magnitude of torque applied to said wheels as a result of the inertial movement of said engine, and means for forming the sum of said first signal value and said second signal value for producing said output signal value.

6. A mechanism as set forth in claim 5 further including a variable time delay device for delaying said first signal value by an interval having a controllable time duration prior to summing said first signal value and said second signal value.

7. A mechanism as set forth in claim 6 wherein said variable time delay device is responsive to increases in the operating speed of said engine to decrease said controllable time duration.

8. In control system for use with an internal combustion engine in a vehicle, said engine being coupled to apply torque to at least one drive wheel of said vehicle by means of a drive train, apparatus for generating a signal value indicative of the amount of torque applied to said drive wheel by said drive train, said apparatus comprising, in combination, means for producing a first signal value indicative of the rate at which fuel is supplied to said engine, means responsive to said first signal for generating a second signal value indicative of the amount of torque generated by said engine, means for producing a third signal value indicative of the rate of change of engine speed, means responsive to said third signal value for producing a fourth signal value indicative of the instantaneous amount inertial torque attributable to the acceleration or deceleration of said engine and drive train, and means for combining said second and said fourth signal values to produce an output signal having a value indicative of the instantaneous torque applied to said drive wheel by said engine and drive train.

9. Apparatus as set forth in claim 8 wherein said means for combining said second and said fourth signal values further comprises means for introducing a relative time delay interval between said second and said fourth signal values prior to forming said combination.

10. Apparatus as set forth in claim 9 wherein said means for introducing said relative time delay interval is responsive to the speed of said engine for increasing the duration of said interval in response to decreases in the speed of said engine.

* * * * *